United States Patent
Cavraro et al.

(10) Patent No.: US 11,982,979 B2
(45) Date of Patent: May 14, 2024

(54) RIPPLE-TYPE CONTROL OF NETWORKED PHYSICAL SYSTEMS

(71) Applicant: Alliance for Sustainable Energy, LLC, Golden, CO (US)

(72) Inventors: Guido Cavraro, Arvada, CO (US); Andrey Bernstein, Golden, CO (US); Manish Kumar Singh, Minneapolis, MN (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 0 days.

(21) Appl. No.: 17/501,743

(22) Filed: Oct. 14, 2021

(65) Prior Publication Data

US 2022/0113685 A1   Apr. 14, 2022

Related U.S. Application Data (60) Provisional application No. 63/091,525, filed on Oct. 14, 2020.

(51) Int. Cl.
| | |
|---|---|
| *G05B 13/02* | (2006.01) |
| *G05B 9/02* | (2006.01) |
| *G06Q 50/06* | (2012.01) |

(52) U.S. Cl.
CPC ............. *G05B 13/024* (2013.01); *G05B 9/02* (2013.01); *G06Q 50/06* (2013.01)

(58) Field of Classification Search
CPC .... G05B 13/024; G05B 9/02; G05B 13/0245; G06Q 50/06
USPC ........................................................ 700/90
See application file for complete search history.

(56) References Cited

U.S. PATENT DOCUMENTS

| | | | |
|---|---|---|---|
| 9,030,177 B2* | 5/2015 | Nakashima | H02M 3/1588 323/285 |
| 2005/0204028 A1* | 9/2005 | Bahl | H04L 41/145 709/223 |
| 2019/0280481 A1* | 9/2019 | Kuroda | H02J 13/00002 |

OTHER PUBLICATIONS

Redl, Richard; Sun, Jian. IEEE Transactions on Power Electronics 24.12: 2669-2680. Institute of Electrical and Electronics Engineers, Inc., 3 Park Avenue, 17th Fl New York NY 10016-5997 USA. (Dec. 2009) (Year: 2009).*

Emiroglu, Selcuk; Uyaroglu, Yilmaz; Ozdemir, Gulcihan. Advances in Electrical and Computer Engineering 17.4: 99-106. Suceava: Stefan cel Mare University of Suceava. (2017) (Year: 2017).*

(Continued)

*Primary Examiner* — Emilio J Saavedra
(74) *Attorney, Agent, or Firm* — Robert G. Pittelkow (57) ABSTRACT

Techniques for ripple-type control of networked physical systems such as power systems, water systems, and others are provided. As one example, a device includes at least one processor configured to determine, for a first controllable device in a system, based on a measurement of an output parameter and a minimum output parameter value, an output violation value for the first device. The processor is further configured to determine, based on a present input value for the first device, the output violation value, and an assistance requisition value corresponding to a second device, a target input value for the first device. The processor is further configured to cause the first controllable device to modify operation based on the target input value and a maximum input value for the first controllable device.

10 Claims, 6 Drawing Sheets

(56) References Cited

OTHER PUBLICATIONS

Wei, "Coordination in Microgrid Networks Using Multi-agent Systems" Doctoral Thesis, Universit'e Bourgogne Franche-Comté2 Dec. 2019, 147 pages (Year: 2019).*

Bolognani et al., "Distributed reactive power feedback control for voltage regulation and loss minimization", rXiv:1303.7173 [math. OC], Nov. 2014, available at https://arxiv.org/pdf/1303.7173.pdf, pp. 1-16.

Chang et al., "Saddle-flow dynamics for distributed feedback-based optimization", IEEE Control Systems Letters, Oct. 2019, vol. 3, No. 4, pp. 948-953.

Singh et al., "Ripple-Type Control for Enhancing Resilience of Networked Physical Systems", 2021 American Control Conference (ACC), New Orleans, LA, May 2021, pp. 2031-2036.

* cited by examiner

RIPPLE-TYPE CONTROL OF NETWORKED PHYSICAL SYSTEMS

CROSS-REFERENCE TO RELATED APPLICATIONS

This application claims the benefit of U.S. Provisional Patent Application No. 63/091,525, filed Oct. 14, 2020, the entire content of which is incorporated herein by reference.

CONTRACTUAL ORIGIN

This invention was made with government support under Contract No. DE-AC36-08GO28308 awarded by the United States Department of Energy. The government has certain rights in the invention.

BACKGROUND

Utility systems, such as power, water, and gas networks, are significant examples of networked systems and are undergoing rapid changes. Power systems, for instance, are experiencing significant penetration of distributed energy resources and flexible load. In another realm, water distribution systems may have monitoring and control systems that aren't ideal for addressing significant disruptive events, such as natural disasters.

SUMMARY

In one example a device includes at least one processor configured to determine, for a first controllable device in a networked system, based on a measurement of an output parameter at the first controllable device and a minimum output parameter value, an output violation value for the first controllable device. The at least one processor is further configured to determine, based on a present input value for the first controllable device, the output violation value, and an assistance requisition value that corresponds to a second device in the networked system that is communicatively coupled to the first controllable device, a target input value for the first controllable device. The at least one processor is further configured to cause the first controllable device to modify operation based on the target input value and a maximum input value for the first controllable device.

In another example a method includes determining, by a computing device comprising at least one processor, for a first controllable device in a networked system, based on a measurement of an output parameter at the first controllable device and a minimum output parameter value, an output violation value for the first controllable device. The method further includes determining, by the computing device, based on a present input value for the first controllable device, the output violation value, and an assistance requisition value that corresponds to a second device in the networked system that is communicatively coupled to the first controllable device, a target input value for the first controllable device. The method further includes causing the first controllable device to modify operation based on the target input value and a maximum input value for the first controllable device.

In another example a system includes a plurality of devices in a networked system. Each device in the plurality of devices comprises at least one processor configured to determine, based on a respective measurement of an output parameter at the device and a minimum output parameter value, a respective output violation value. The at least one processor is further configured to determine, based on a respective present input value, the respective output violation value, and an assistance requisition value that corresponds to another device in the plurality of devices that is communicatively coupled to the device, a respective target input value. The at least one processor of at least one device in the plurality of devices is further configured to modify its operation based on the respective target input value and a respective maximum input value.

The details of one or more examples are set forth in the accompanying drawings and the description below. Other features, objects, and advantages will be apparent from the description and drawings, and from the claims.

DETAILED DESCRIPTION

The present disclosure provides systems, devices, and methods for ripple-type control of networked physical systems. In accordance with the techniques described herein, a controllable device within a networked system may receive requests for assistance from communicatively adjacent devices in the system and operation of the controllable device may account for the needs of such other devices. In some examples, when the controllable device is unable to meet its own needs and/or those of the other devices, the controllable device may communicate its needs to communicatively adjacent devices, creating a ripple effect through the system, thereby addressing devices' needs. In other words, as further described herein, devices (also referred to herein as control agents or agents) may implement a hybrid, low-communication, saturation-driven protocol for the coordination of control agents that are distributed over a system and are allowed to communicate with peers over a communication network. In accordance with this protocol, agents act upon local readings unless and until their control resources have been depleted. Upon determining that they won't be able to sufficiently address a situation themselves, the agents send a beacon for assistance to peer agents.

This ripple-type scheme triggers communication locally only for the agents with saturated resources and is proved to converge. Moreover, under a monotonicity assumption on the underlying physical law coupling control outputs to inputs, the devised control is proved to converge to a configuration satisfying safe operational constraints if such configuration exists. The assumption is shown to hold for voltage control in electric power systems and pressure control in water distribution networks. Numerical tests on both networks corroborate the efficacy of the techniques disclosed herein.

Utility systems, such as power, water, and gas networks, are significant examples of networked systems and are undergoing rapid changes. Power systems, for instance, are experiencing significant penetration of distributed energy resources and flexible load, which are increasing the system volatility. Natural gas-fired generators serve as a fast-acting balancing mechanism for power systems, but inadvertently increase the volatility in gas networks. Rising threats of clean water scarcity have motivated tremendous efforts towards judicious planning for bulk water systems and enhanced monitoring and control for water distribution networks. Moreover, increasing occurrence of natural disasters and other critical (both cyber and physical) disruptions undermines the stable and efficient operation of the aforementioned systems.

Classic operation of utility systems is performed via management systems that aim to satisfy consumer demands in a cost-effective manner while meeting the related operational and physical constraints. Such tasks constitute the family of optimal dispatch problems (ODP). ODPs may be solved at regular intervals based on anticipated demands and network conditions. Stochastic optimization formulations may be leveraged to account for the uncertainty in network conditions and ensure reliable operation within the ODP interval. Although ODP solutions may be able to ensure reliable system operation during normal conditions, they cannot account for the occurrence of low-probability, high-impact disruptions that might undermine system operation. To improve system resilience to these events, emergency control schemes are necessary that can help avoid system collapse by executing fast actions in real time.

The present disclosure details the design of emergency control techniques that can ensure the satisfaction of system operational requirements during the time-interval between two ODP actions. The techniques described herein can be referred to as ripple-type control and draw features from local, distributed, and event-triggered control. In related-art local control rules, agents make decisions based upon on locally available readings. For example, power generators may control their reactive power output given their local power injection and voltage. However, such local schemes may have limited efficacy. Related-art distributed control strategies, in which agents compute their control action after sharing information with neighbors in a communication network, have a wide spectrum of applications, from energy systems to camera networks. To avoid wasting resources and communicate only when really needed, event-triggered control techniques have been advocated in the literature. For instance, every agent may evaluate a triggering function locally (e.g., in a consensus setup, the mismatch between the current state and the state that was last sent to neighbors). When the triggering function takes some specified values, agents communicate and update their control rule.

On the contrary, in accordance with the ripple-type control techniques of the present disclosure, agents first try to satisfy their local constraints via purely local control. Only when such control efforts reach their maximum limit is assistance sought from neighboring agents on a communication graph. The process is continued until the control objectives of every agent are met. Another property of the disclosed techniques is that they are model-free in the sense that it does not require the knowledge of the system model parameters. This is an essential property of real-time emergency control, due to lack of accurate model information during contingency scenarios.

The techniques described herein provide a ripple-type control algorithm for ensuring satisfaction of operational requirements, and the present disclosure details how such an algorithm was devised and formally analyzed. Furthermore, to show applicability of the disclosed techniques in real systems, the control scheme was tested on electric power and water networks. While discussed herein primarily in the context of power and water distribution networks, the techniques of the present disclosure may be applied to various other types of resource networks that adhere to the monotonicity assumption.

Figure 1:
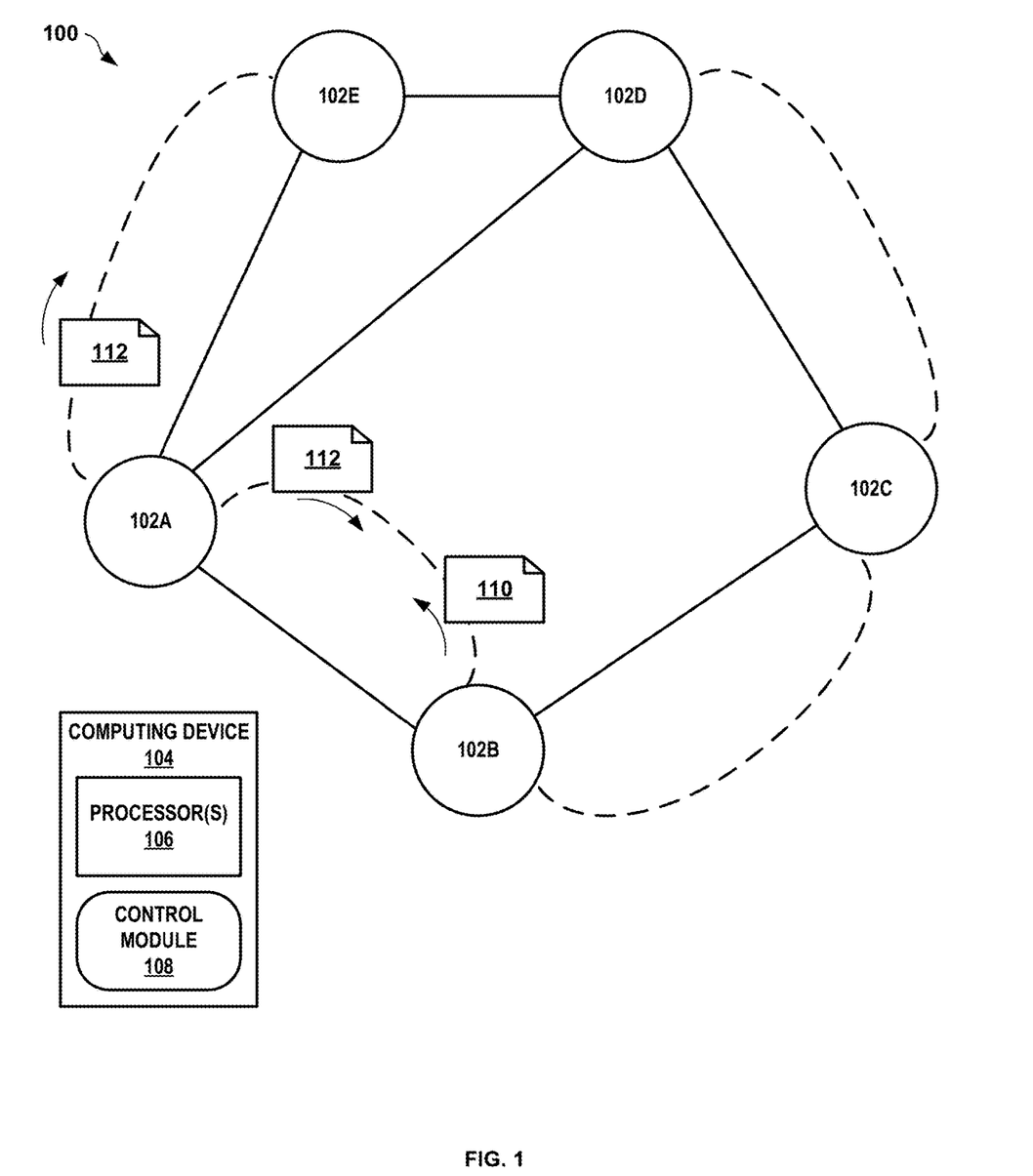
FIG. 1 is a conceptual diagram illustrating a networked physical system configured to implement ripple-type control, in accordance with one or more aspects of the present disclosure.

FIG. 1 is a conceptual diagram illustrating a networked physical system (system 100) configured to implement ripple-type control, in accordance with one or more aspects of the present disclosure. In the example of FIG. 1, system 100 includes nodes 102A-102E (collectively "nodes 102"). Nodes 102 are connected via distribution/transmission lines, which are represented in the example of FIG. 1 by solid lines between nodes. Nodes 102 are also connected via communication lines, which are represented in the example of FIG. 1 by dashed lines between nodes.

FIG. 1 represents one simple example of a networked system configured to implement ripple-type control. In other examples, the techniques of the present disclosure may be utilized in various other systems. For example, in other examples, system 100 may include more or fewer nodes 102, and/or include more, fewer, or different distribution/transmission lines or communication lines.

In the example of FIG. 1, system 100 may represent a power network. For instance, each of nodes 102 may be a power generator and/or a power consumer. Examples of nodes 102 include generators, such as utility scale power plants (e.g., coal, wind, natural gas, photovoltaics (PV), etc.), regional scale or home PV installations, generators (e.g., diesel generators), batteries or other power storage, or any other device or system capable of generating electrical power. Additional examples of nodes 102 include loads, such as factories, homes, commercial buildings, machinery, equipment, lights, HVAC units, batteries or other power storage, or any other device or system capable of consuming electrical power. In other words, the techniques of the present disclosure may be utilized in various networks, from utility scale power grids (transmission, distribution, etc.) to home energy management systems or beyond.

In the example of FIG. 1, system 100 also includes computing device 104. Examples of computing device 104 may include, but are not limited to, typical computers such as laptop computers, desktop computers, server computers, mainframes, etc. Additional examples of computing device 104 may include devices configured to manage electrical power generation or consumption, such as PV inverters, "intelligent" loads, etc. In other words, computing device 104 may represent any device having a processor and capable of performing the techniques described herein.

In the example of FIG. 1, computing device 104 is configured to implement ripple-type control for node 102A. That is, computing device 104 may perform the operations described herein within the perspective of node 102A. In some examples, nodes 102B-102E may each be associated with a similar computing device (not shown). Furthermore, while shown in the example of FIG. 1 as separate from node 102A, computing device 104 may, in other examples, be integrated with or otherwise a part of node 102A. That is, the techniques of the present disclosure may be performed by computing devices distinct from their associated nodes, may be performed by unified, integrated devices, or may be performed by some hybrid (e.g., a plugin hardware module), thereby allowing for backward compatibility with existing devices and systems.

In the example of FIG. 1, computing device 104 includes one or more processors 106 and control module 108. One or more processors 106 may implement functionality and/or execute instructions within computing device 104. For example, processors 106 of computing device 104 may receive and execute instructions stored by storage devices of computing device 104 (not shown), thereby enabling the functionality of control module 108.

Control module 108, in the example of FIG. 1, may perform one or more operations described herein using hardware, software, firmware, or a mixture thereof residing within and/or executing at computing device 104. Computing device 104 may execute control module 108 with one processor or with multiple processors.

In accordance with the techniques provided herein, computing device 104 may be configured to determine, for a first controllable device in a networked physical system an output violation value for the first controllable device. In other words, computing device 104 may determine an amount by which the output at the controllable device is below the minimum "required" output at the controllable device. In the example of FIG. 1, for instance, control module 108 may be operable by processors 106 to determine an output violation value for node 102A. The output violation value for node 102A may be determined based on a measurement of an output parameter at the first controllable device and a minimum output parameter value. In the example of FIG. 1, the output parameter may be voltage. The minimum output parameter value constitutes a minimum allowed value of the output parameter at the controllable device. This value may be set by a manager of the system or in some other fashion. In some examples, the minimum output parameter value may be specific to the controllable device, while in other examples, the minimum output parameter value may be global or the same for all devices. In the example of FIG. 1, the minimum output parameter value may be defined by a manager of system 100 and constitutes a minimum allowable voltage at node 102A necessary to avoid voltage collapse in system 100. In the example of FIG. 1, computing device 104 may determine that the output voltage at node 102A is above the minimum allowable voltage at node 102A, and thus the output violation value may be determined as zero.

Computing device 104 may be further configured to determine a target input value for the first controllable device. Computing device 104 may determine the target input value based on a present input value for the first controllable device, the output violation value, and an assistance requisition value that corresponds to a second device in the networked physical system that is communicatively coupled to the first controllable device. In other words, computing device 104 may determine how the input for the controllable device should be modified to address the controllable device's output violation (if any), as well as the needs of other, connected devices. In the example of FIG. 1, for instance, control module 108 may be operable by processors 106 to receive (via the communication lines) assistance requisition values from other nodes 102 that are connected to node 102A—i.e., nodes 102B and 102E. In the example of FIG. 1, control module 108 may receive assistance requisition value 110 from node 102B. In some examples, control module 108 may receive another assistance requisition value (not shown) from other communicatively coupled nodes, such as node 102E. In the example of FIG. 1, using assistance requisition value 110, as well as the present input value for node 102A and the output violation value at node 102A, computing device 104 may determine a target input value for node 102A. The assistance requisition value 110 may indicate that node 102B requires assistance in order for other devices (e.g., node 102B and/or others) to avoid an output violation. Assistance requisition value 110 may be quite large, causing the target input value to be quite large.

Computing device 104 may be further configured to cause the first controllable device to modify operation based on the target input value and a maximum input value for the first controllable device. In other words, computing device 104 may attempt to cause the controllable device to modify operation, within its ability, to address both its own output violation as well as the needs of the other, connected devices. In the example of FIG. 1, for instance, control module 108 may be operable by processors 106 to cause node 102A to modify operation based on the target input value and a maximum input value for node 102A. The maximum input value constitutes a maximum input value achievable by the controllable device. In some examples, this may be an inherent property of the controllable device (e.g., a maximum output power or voltage of a PV inverter) or may be a value defined by a manager of the system, the device, or other entity. In the example of FIG. 1, for instance, the maximum input value may be the maximum allowable power output of node 102A. As such, computing device 104 may cause node 102A to adopt, as its setpoint, the smaller of the target input value or the maximum input value. In the example of FIG. 1, for instance, the target input value may be larger than the maximum input value, and thus computing device 104 may cause node 102A to use, as its input value, the maximum input value.

In some examples, computing device 104 may be further configured to determine an updated assistance requisition value for the first controllable device. Computing device 104 may determine the updated assistance requisition value based on the target input value and the maximum input value. In other words, computing device 104 may determine whether the controllable device is capable of addressing its own output violation as well as the needs of the other, connected devices. Computing device 104 may determine its own assistance requisition value indicating whether it is capable of doing so. In the example of FIG. 1, for instance, control module 108 may be operable by processors 106 to determine an updated assistance requisition value for node 102A, based on the target input value for node 102A and the maximum input value for node 102A. Because the target input value is larger than node 102A's maximum input value, computing device 104 may determine a non-zero updated assistance requisition value that indicates that node 102A now needs assistance.

In some examples, computing device 104 may be further configured to output, for use by devices in the networked physical system that are communicatively coupled to the first controllable device, the updated assistance requisition value. In other words, computing device 104 may inform other, connected devices whether or not the controllable device needs assistance based on its inability to provide enough output for itself and those requesting it. In the example of FIG. 1, for instance, control module 108 may be operable by processors 106 to output updated assistance requisition value 112. Updated assistance requisition value 112 indicates node 102A's need for assistance and may be used in updating the target input values for nodes 102B and 102E.

In some examples, computing device 104 may perform the techniques described in the example of FIG. 1 in an iterative fashion. That is, after modifying operation of node 102A and outputting updated requisition value 112, computing device 104 may again determine an output violation value, determine a target setpoint, and modify operation of node 102A. In some examples, computing device 104 may determine a newly updated requisition value and output the newly updated requisition value for use by nodes 102B and 102E. In this way, computing device 104 and other such devices (not shown) may cause assistance requests to "ripple" through system 100 as necessary to avoid output violations.

Though not shown in the example of FIG. 1, nodes 102B-E may perform (or have associated computing devices that perform) some or all of the techniques performed by computing device 104. In some examples, some devices in a network may not be controllable. For instance, some of nodes 102 may be able (or may have associated computing devices that are able) to determine output violations at the node and send requisition values to other communicatively connected nodes, but the inputs for nodes may not be modifiable.

By implementing the ripple-type control techniques described herein, computing device 104 may ensure that nodes 102 avoid dropping below an output violation value while also minimizing the necessary communication among nodes 102. Furthermore, there is no need for computing device 104 to have any knowledge of system 100 (such as a system model) or the underlying mechanics of the system (such as power flow equations). Instead, the techniques described herein leverage the monotonic nature of the system to provide efficient assistance to communicatively adjacent nodes, thereby allowing system 100 to quickly reach a feasible state. As such, the techniques described herein thereby improve the computing efficiency of the system as well as provide a solution to the problem of how to address issues at one node using others in a minimally communicative manner.

The following provides a mathematical formulation of the techniques described herein. The following notation is used: lowercase and uppercase boldface letters denote column vectors and matrices, respectively. Sets are represented by calligraphic symbols. The symbol T stands for transposition. Inequalities, max, and min operators are understood elementwise. All-zero and all-one vectors are represented by 0 and 1; the respective dimensions are deducible from context. The dg(•) operator on vectors places the vector on the principal diagonal of a matrix. On a matrix, it extracts the diagonal as a vector. Symbol $\|\cdot\|$ represents the $L_2$ norm.

Consider a networked system modeled by an undirected graph $\mathcal{G} = \mathcal{N}, \varepsilon)$. The set $\mathcal{N}$ is a collection of N nodes hosting controllable agents and vector $u \in \mathbb{R}^N$ represents their control inputs. A subset of agents comprising set $\mathcal{Y} \subset \mathcal{N}$ of cardinality M are assumed to be making local noiseless scalar observations, which are stacked in vector $y \in \mathbb{R}^M$. The entries of y, henceforth referred to as outputs, are to be regulated within a desired range. Given an input u, the system has a locally unique output y, determined by a mapping $F: \mathbb{R}^N \to \mathbb{R}^M$. Heed that the mapping F may not necessarily have an explicit form. This work considers physical systems in which the related mapping F adheres to the following property.

Assumption 1. The input-output mapping F is such that, for any u, $m \in \mathcal{Y}$, and $n \in \mathcal{N}$, it holds $$\frac{\partial y_m}{\partial x_n} \geq 0$$

Albeit it might seem restrictive at the outset, the postulated monotonicity property holds true for several physical systems abiding by a dissipative flow law, such as natural gas transmission systems and water distribution networks. Moreover, this assumption is approximately true for electric power systems as delineated next.

The task of maintaining power system voltages above given lower limits is next considered. A power system may be modeled by a graph $\mathcal{G} = (\mathcal{N}, \varepsilon)$, wherein electrical buses can be interpreted as agents. Buses in such networks are typically modeled as generator (PV) buses for which the active power injection and voltage magnitude are controlled; and load (PQ) buses for which the complex power injection is fixed and is independent of voltage. Let $(v_n, q_n)$ denote the voltage magnitude (or simply voltage) and reactive power injection at bus $n \in \mathcal{N}$. Vectors v, $q \in \mathbb{R}^N$ collect the voltages and reactive injections across buses.

Transmission lines are often approximated as lossless, since their resistances are much smaller than their reactances. Thanks to this lossless approximation and the assumption of small voltage angle differences across neighboring buses, voltage angles (resp. magnitudes) are rather insensitive to variations in reactive (resp. active) power injections. To develop voltage control algorithms, the focus here is on the q–v system. Vectors v and q adhere to the approximate model $$q = dg(v) B v. \quad (1)$$

where $B \in \mathbb{R}^{N \times N}$ is a Laplacian matrix with line susceptances as weights. In detail, its (m, n)-th entry $B_{mn} < 0$ equals the negative susceptance of line $(m, n) \in \varepsilon$; it equals zero if there is no line between buses m and n; and its diagonal entries are $B_{mm} = -\Sigma_{n \neq m} B_{mn} > 0$.

Partition the node set $\mathcal{N}$ into generator and load buses as $\mathcal{N} = \mathcal{N}_S \oplus \mathcal{N}_L$. Arranging v and q as $v = [v_G^T v_L^T]^T$ and $q = [q_G^T q_L^T]^T$, model (1) can be written as $$\begin{bmatrix} q_G \\ q_L \end{bmatrix} = \begin{bmatrix} dg(v_G) & 0 \\ 0 & dg(v_L) \end{bmatrix} \begin{bmatrix} B_{GG} & B_{GL} \\ B_{LG} & B_{LL} \end{bmatrix} \begin{bmatrix} v_G \\ v_L \end{bmatrix} \quad (2)$$

where B has been partitioned accordingly.

For the voltage regulation task at hand, the control variable depends on the type of each bus n:

$$u_n := \begin{cases} q_n, & n \in \mathcal{N}_L \\ v_n, & n \in \mathcal{N}_S \end{cases}.$$

Generators can control their voltages, while loads could partially control their reactive injections due to inverters, capacitor banks, and flexible AC transmission systems (FACTS).

By controlling the inputs u, voltage regulation aims to maintain the load voltages $v_L$ within acceptable levels. To this end, it is necessary to analyze the dependence of the output $y = v_L$ on the control input $u = [q_L^T v_L^T]^T$. Unfortunately, the quadratic equations in (2) are not amenable to a closed-form expression of y in terms of u. Thus, a linearization from the literature was adopted to compute the Jacobian matrix of y with respect to u. Let $$\tilde{v} := \min_{n \in N_G} v_n$$

and define $$\begin{bmatrix} \epsilon_G \\ \epsilon_L \end{bmatrix} := \frac{1}{\tilde{v}} \begin{bmatrix} v_G \\ v_L \end{bmatrix} - 1. \quad (3)$$

The second block equation of (2) provides $$q_L = \tilde{v}^2 dg(1+\epsilon_L)(B_{LG}(1+\epsilon_G)+B_{LL}(1+\epsilon_L)) \approx \tilde{v}^2(B_{LG}\epsilon_G + B_{LL}\epsilon_L), \quad (4)$$

wherein terms involving products between $\epsilon$'s were ignored and the property $[B_{LG} B_{LL}]1=0$ of B was used. Solving for $\epsilon_L$ in (4) and re-substituting voltages from (3) yields $$v_L \simeq \frac{1}{\tilde{v}} B_{LL}^{-1} q_L - B_{LL}^{-1} B_{LG} v_G. \quad (5)$$

Equation (5) approximates the mapping F for the voltage regulation task. Being a diagonal block of a Laplacian, matrix $B_{LL}$ is known to be positive definite and hence a non-singular. Additionally, because its off-diagonal entries are non-positive, matrix $B_{LL}$ is an M-matrix, so that all entries of $B_{LL}^{-1}$ are non-negative. This establishes that the Jacobian of $y=v_L$ with respect to $q_L$ has non-negative entries. The same property holds for the Jacobian of $v_L$ with respect to $v_G$ since $B_{LG}$ has non-positive entries. The previous arguments show that the approximate model (1) satisfies Assumption 1. This linearized model is employed due to analytical convenience for verifying Assumption 1. However, the numerical tests described below use a nonlinear AC power flow model.

A water distribution system (WDS) can be modeled by an undirected graph $\mathcal{G} = (\mathcal{N}, \varepsilon)$, where the nodes in $\mathcal{N}$ correspond to water reservoirs, tanks, junctions and consumers. If $d_n$ denotes the rate of water injection at node n, then $d_n \geq 0$ for reservoirs; $d_n \leq 0$ for water consumers; tanks may be filling or emptying; and $d_n = 0$ for junctions. Nodes are connected by edges in $\varepsilon$ which represent pipelines, pumps and valves. Let $\sigma_{mn}$ denote the water flow rate on edge (m, n) along the direction from m to n, with $\sigma_{mn} = -\sigma_{nm}$. Flow conservation at node n dictates $$d_n = \Sigma_{m:\,(n,m) \in \varepsilon} \sigma_{nm} \quad (6)$$

The relation between water flow $\sigma_{mn}$ across edge (m, n) and the pressures $\pi_m$ and $\pi_n$ at nodes m and n takes the form $$\pi_m - \pi_n = \rho_{mn}(\sigma_{mn}) \quad (7)$$

The operation of a WDS involves serving water demands while maintaining nodal pressures within desirable levels. The task of pressure control may include continuous-valued variables, such as reservoir and tank output pressures, as well as water injections at different nodes. Pressure control may also involve binary variables capturing the on/off status of fixed-speed pumps and valves. These continuous and binary control variables are oftentimes determined by periodically solving ODPs. Assuming the binary variables to be fixed between two ODP instances, the next focus is on the continuous-valued variables. Partition set $\mathcal{N}$ into the subset $\mathcal{N}_S$ comprising of reservoirs and tanks, and subset $\mathcal{N}_L$ representing loads. The pressures and demands for nodes in $\mathcal{N}_S$ and $\mathcal{N}_L$, respectively, are assumed to be controllable. This is without loss of generality as inelastic quantities can be modeled with lower and upper limits coinciding. Thus, the control variables are $$u_n := \begin{cases} \pi_n, & n \in \mathcal{N}_S \\ d_n, & n \in \mathcal{N}_L \end{cases}.$$

Given u, the water injections for the nodes in $\mathcal{N}_S$ and the pressures at nodes in $\mathcal{N}_L$ are determined by the water flow equation (6)-(7). Since nodal pressures over $\mathcal{N}_L$ need to be maintained at stipulated levels, they constitute vector y. Note that for the aforementioned assignments of vectors u and y, the mapping F is implicitly defined by (6)-(7). Relevant works have guaranteed that the mapping F maps a given u to a unique y.

To verify the validity of Assumption 1, a monotonicity result for dissipative flow networks from the literature was used. To qualify as a dissipative flow network, functions $\tau_{mn}(\cdot)$ should be non-decreasing and continuous. Both these requirements hold true for edges in a WDS. Specifically, for a pipe $(m,n) \in \varepsilon$, the function $\rho_{mn}$ models the pressure drop due to friction along the pipe described by the Darcy-Weisbach or the Hazen-Williams laws; both being nondecreasing and continuous. For pumps and valves, pressures $\pi_m$ and $\pi_n$ relate to flow $\sigma_{mn}$ via non-decreasing empirical laws as well. Therefore, WDS come within the purview of dissipative networks and the ensuing result applies.

Lemma 1. Let $\pi$ and $\pi'$ be N-length pressure vectors satisfying the water flow equations (6)-(7) for demand vectors d and d'. If $\pi_n \geq \pi'_n$ for all $n \in \mathcal{N}_S$, and $d_n \geq d'_n$ for all $n \in \mathcal{N}_L$, then $\pi_n \geq \pi'_n$ for all $n \in \mathcal{N}_L$.

In terms of the assigned vectors u and y, Lemma 1 states that controls $u \geq u'$ If result in $y \geq y'$. Thus, considering infinitesimal changes at node pairs m and n, Lemma 1 translates to $$\frac{\partial y_m}{\partial y_n} \geq 0,$$

hence satisfying Assumption 1.

Operators manage the networked systems described above by computing periodically the control setpoints that agents should implement. Usually, these control setpoints are the solution of an optimal dispatch problem (ODP) of the form $$u^* \in \arg\min_u c(u, y) \quad \text{(ODP)}$$

$$s. \text{ to } y = F(u) \quad (8a)$$

$$h(u, y) \leq 0, \quad (8b)$$

$$\underline{u} \leq u \leq \overline{u} \quad (8c)$$

$$y \geq \underline{y} \quad (8d)$$

where c(u, y) is a cost function depending on both the system inputs and outputs; the mapping in (8a) corresponds to the physical laws governing the networked system; while inequality constraints can be divided into two categories:

The function in (8b) captures requirements that are important for efficiently operating the system, but can in principle be safely violated (especially for a short amount of time). These will be referred to as soft constraints.

Constraints (8c) and (8d) impose limitations on input and output variables, respectively. If violated, they can lead to system failure. These constraints will be referred to as hard constraints.

Typically, given the set of parameters defining mapping F, a central dispatcher solves (ODP) and communicates optimal control setpoints u* to agents. Ideally, this process shall be repeated every time there is a change in the system model that justifies the underlying definition of F, such as an abrupt load change or line tripping for the case of power systems. Constrained by communication and computational resources, however, problem (ODP) is solved only at finite time intervals. As a consequence, the setpoints u* can become obsolete or even result in network constraint violations.

Such limitations motivate the design of mechanisms to at least ensure that some important operational requirements are met between two consecutive centralized dispatch actions, i.e., to make the control vector u belong to the feasible set $$\mathcal{F} = \{u : \underline{u} \leq u \leq \overline{u}, y = F'(u), y \geq \underline{y}\}$$

in which F' is the input-output mapping defined by the system model after a disruptive event. Set $\mathcal{F}$ only considers the hard constraints of (ODP), namely (8c) and (8d).

Remark 1. For power systems, constraint (8b) models line flow limits, which can be considered soft constraints as their violation could be briefly tolerated. Limits on the power or voltage output of generators are captured by (8c). Inequality (8d) models load voltage constraints. Avoiding dangerously low voltages is important to prevent a voltage collapse.

Remark 2. For water distribution systems, the inequalities (8b) can represent the water flow limits on pipes and pumps. Although such limits shall normally be respected, they can be characterized as soft over short time intervals. Constraints (8c) represent the limits on pressure at water sources and demands by consumers. These limits can not be violated physically as they are determined by the actual capacity of the WDS components and available demands. The inequalities in (8d) can model the minimum pressure requirements at consumer nodes. The latter requirements must be adhered to at all times as low pressures may cause service failures and equipment malfunction at the consumer end.

Next, an algorithm for steering u to $\mathcal{F}$ can be put forth with the ensuing key attributes:

A1) Agent $n \in \mathcal{F}$ measures $y_n$ and controls $u_n$ locally. Upon a violation of (8d), local control resources are used first.

A2) Agent n transmits communication signals to a few peer agents over a communication network only if $u_n = \overline{u}_n$, i.e., only when local control resources reach their maximum limit, assistance is sought from neighboring nodes on a communication graph; and A3) The control scheme is agnostic to system parameters, i.e., it is a model-free approach that does not require explicit knowledge of operator F'.

The communication network is modeled as a graph $\mathcal{F}_c = (\mathcal{F}, \varepsilon_c)$ in which the communication links $\varepsilon_c$ do not necessarily coincide with the physical connections among agents. Graph $\mathcal{F}_c$ is henceforth assumed to be connected. Denote as A its adjacency matrix. If node m and node n are not connected, then A(m, n)=0. Otherwise, A(m, n)≠0. A(m, n) is a parameter that can be designed and is always nonnegative. The function f: $\mathcal{F}^N \to \mathcal{F}^N$ is also introduced, defined entry-wise as $$f_n(u) := \begin{cases} \underline{y}_n - y_n(u), & \underline{y}_n \geq y_n(u), \ n \in y \\ 0, & \text{otherwise} \end{cases} \quad (9)$$

Assume that, at time t=0, a violation of (8d) occurs as a consequence of a model change. Let u(0) be the initial control variables, and introduce an auxiliary vector $\lambda \in \mathcal{F}^N$, which is initialized as $\lambda(0)=0$. At subsequent times t≥1, the control scheme proceeds in four steps as delineated next.

Step 1: Agents compute f(u(t))≥0 according to (9). The entries of f(u(t)) are strictly positive if the associated nodes in $\mathcal{F}$ experience a violation of (8d); and zero, otherwise.

Step 2: A target setpoint is computed as $$\hat{u}(t+1) = u(t) + dg(\eta_1) f(u(t)) + dg(\eta_2) A \lambda(t) \quad (10)$$

for positive $\eta_1$ and $\eta_2$. Note that for node n, the target $\hat{u}_n(t)$ is computed using the local reading $y_n(t)$ and the entries of $\lambda$ sent from its peers (neighbor nodes of node n on $\mathcal{F}_c$).

Step 3: Agents compute the auxiliary vector $\lambda$ as $$\lambda(t+1) = \max\{0, dg(\eta_3)(\hat{u}(t+1) - \overline{u})\} \quad (11)$$

for a positive $\eta_3$. Vector $\lambda$ serves as a beacon for assistance that is communicated across peer nodes.

Step 4: The target setpoint is projected to the feasible range $$u(t+1) = \min\{\hat{u}(t+1), \overline{u}\} \quad (12)$$

and is physically implemented.

To establish the effectiveness, Proposition 1 proves that the proposed scheme reaches an equilibrium point and Proposition 2 that this equilibrium belongs to $\mathcal{F}$. The proofs for these results are provided herein below.

Proposition 1. Given any u(0), the sequence {u(t)} converges asymptotically.

Proposition 2. Let Assumption 1 hold, $\mathcal{F}$ be non-empty, and $$\|dg(\eta_2) dg(\eta_3) A\| < 1. \quad (13)$$

A pair (u, $\lambda$) is an equilibrium for the proposed scheme if and only if u belongs to $\mathcal{F}$ and $\lambda=0$.

The control scheme disclosed herein satisfies attribute A1) by design. Moreover, for a node n with target setpoints $\hat{u}_n$(t+1) within the local control limit $\overline{u}_n$, the corresponding entry of $\lambda$(t+1) is zero. Thus the computation of $\hat{u}_m$ from (10) for nodes m that are neighbors of n requires no communication from node n, hence fulfilling A2). The scheme also meets A3) since it is agnostic to changes in topology and/or demands.

Remark 3. Apparently, parameter $\eta_1$ does not influence the control scheme convergence. Indeed, (13) provides a condition only on $\eta_2$ and $\eta_3$. However, $\eta_1$ plays a role in determining the equilibrium point and the speed of convergence, whose analytical quantification is beyond the scope of this disclosure.

The control algorithm disclosed herein was tested for two utility network applications: voltage control in power systems and pressure control in water systems. Commencing with the power system, parameters $\eta_2$ and $\eta_3$ were chosen so that (13) holds true. In general, parameters $\eta_1$, $\eta_2$, and $\eta_3$ may each be considered to represent responsiveness, by quantifying how aggressively updates are implemented.

Figure 2:
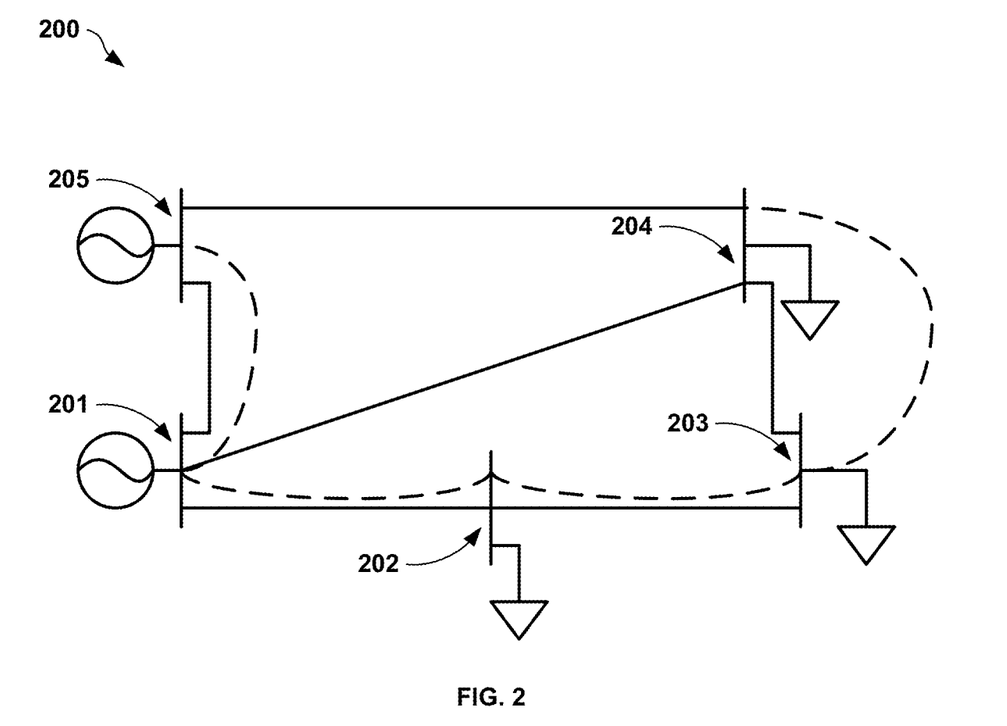
FIG. 2 is a conceptual diagram illustrating a modified version of the PJM 5-bus power system configured to implement ripple-type control, in accordance with one or more aspects of the present disclosure.

FIG. 2 is a conceptual diagram illustrating a modified version of the PJM 5-bus power system (system 200) configured to implement ripple-type control. System 200 includes buses 201-205. Communication links among buses 201-205 are shown as dashed lines in FIG. 2. In the example of FIG. 2, buses 201 and 202 serve as generators, whereas buses 203, 204, and 205 are PQ buses. Buses 201 and 202 may represent large power plants, renewable power generators, grid scale energy storage, or any other power generation means. Buses 203, 204, and 205 may represent points of power consumption, such as subtransmission or distribution networks, industrial consumers, non-dispatchable generators, and other power consumption means.

For the purposes of testing, generators were allowed to raise their voltage output to 1.02 p.u.; loads could reduce their power demand by 10 MW and their voltages were required to be above $V_{thr}$=0:94 p.u., which represents a safe threshold.

Figure 3A:
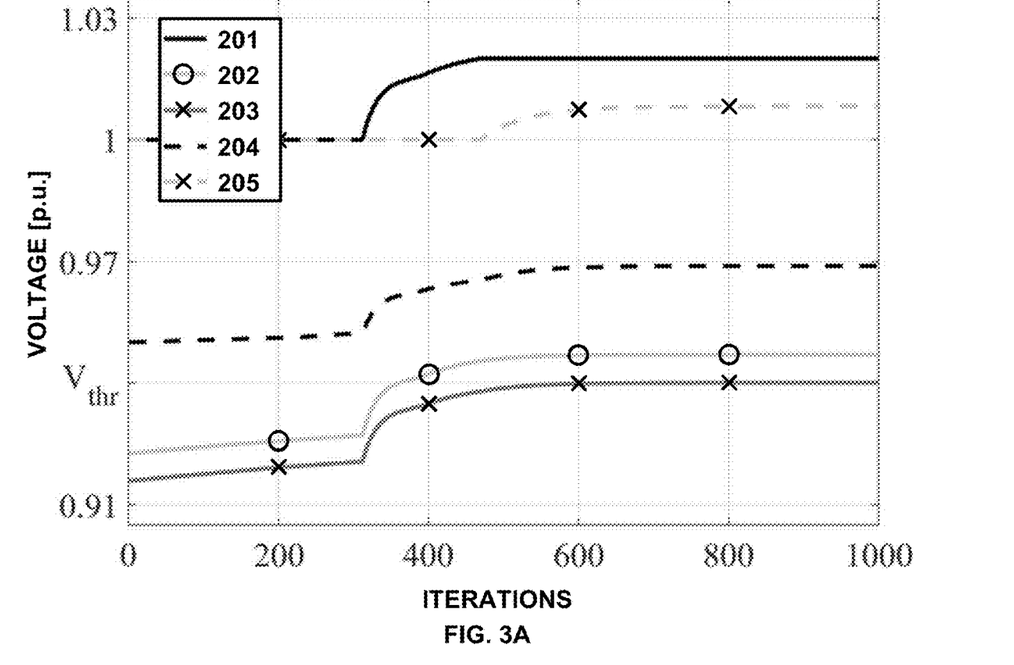
FIGS. 3A and 3B are graphical plots illustrating the results of using the techniques described herein to control the power system shown in FIG. 2.
Figure 3B:
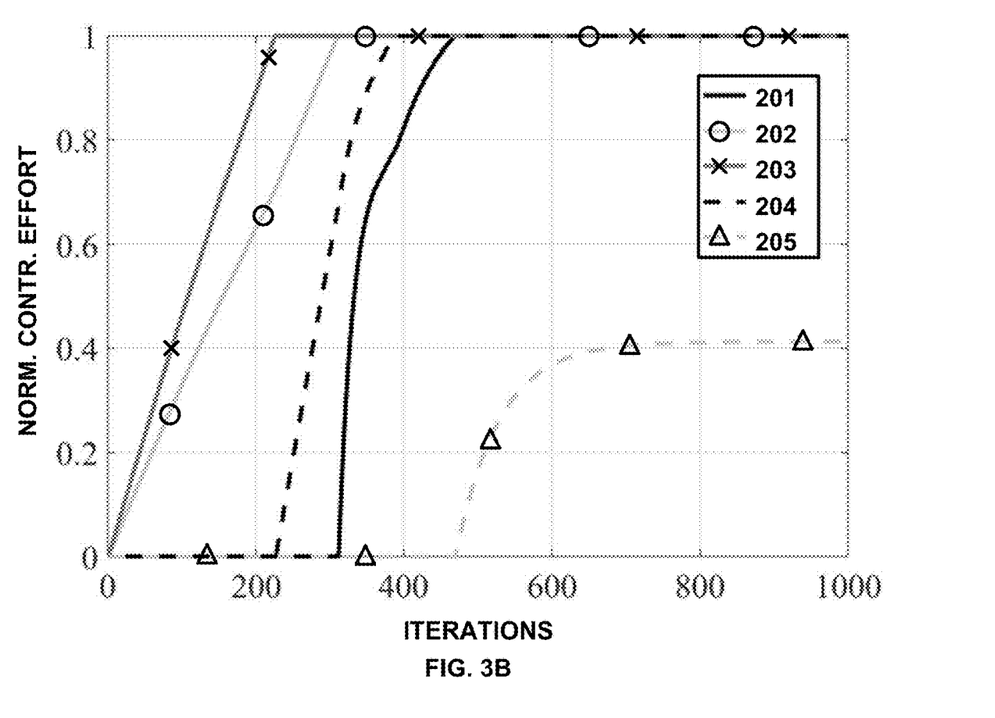

FIGS. 3A and 3B are graphical plots illustrating the results of using the techniques described herein to control power system 200 shown in FIG. 2. Specifically, FIG. 3A shows the bus voltage trajectories, while FIG. 3B plots the ratio of control resources used $u_n/\bar{u}_n$. As depicted in FIGS. 3A and 3B, after an abnormal event, buses 202 and 203 find themselves with voltage below $V_{thr}$ and start performing the control strategy disclosed herein. Since their local efforts do not manage to regulate the voltages, they seek assistance from their neighbors in the communication network—namely bus 204 (around the 200$^{th}$ iteration) and bus 201 (around the 300$^{th}$ iteration). Finally, when bus 201 hits its control limits, bus 205 kicks in (after the 400$^{th}$ iteration) and is finally able to bring the voltage within the safe interval.

Figure 4:
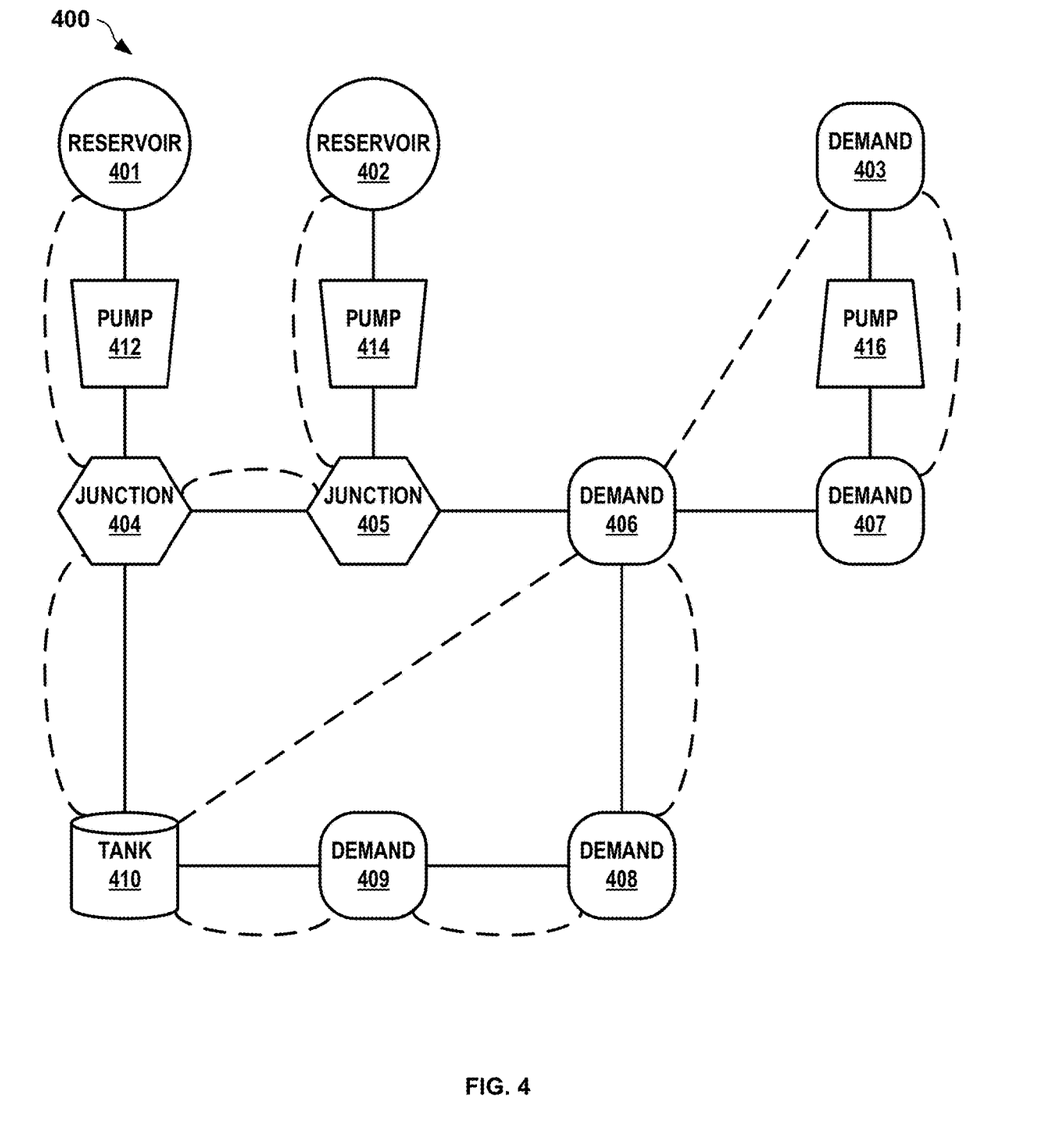
FIG. 4 is a conceptual diagram illustrating a 10-node benchmark water distribution system configured to implement ripple-type control, in accordance with one or more aspects of the present disclosure.

FIG. 4 is a conceptual diagram illustrating a 10-node benchmark water distribution system (system 400) configured to implement ripple-type control, in accordance with one or more aspects of the present disclosure. System 400 includes reservoirs 401 and 402 (also referred to herein as nodes 1 and 2, respectively), which may represent any water storage facility such as a municipal reservoir or larger body of water. System 400 also includes demands 403, 407, 408, and 409 (also referred to herein as nodes 3, 7, 8, and 9, respectively), which may represent commercial or industrial buildings, homes, treatment facilities, or any entity to which water is to be provided for consumption. System 400 also includes junctions 404, 405, and 406 (also referred to herein as nodes 4, 5, and 6, respectively), which may represent interconnections in the water distribution network. System 400 also includes tank 410 (also referred to herein as node 10), which may represent a water tower or like water storage structure. Finally, system 400 also includes pumps 412, 414, and 416, which may represent any device capable of ensuring/increasing pressure along a water pipe. Communication links among nodes 1-10 are shown as dashed lines in FIG. 4.

In the example of FIG. 4, system 400 includes seven lossy pipes: between nodes 404 and 405; between nodes 405 and 406; between nodes 406 and 408; between nodes 404 and 410; between nodes 409 and 410; between nodes 408 and 409; and between nodes 406 and 407. Pipe dimensions and friction coefficients were taken from a literature reference. The minimum pressure requirement $\pi_n$ for nodes 3 to 10 is {10,7,10,10,5,10,10,10} m. The pumps 412, 414, and 416 are considered to be operating at fixed speeds with constant pressure gains of 10, 10, and 5 m, respectively. All water flow instances were solved using the optimization-based solver detailed in a literature reference. The base operating condition involves injection $d_0$=[380,300, −170,0,0, −220, −200, −150, −140,200]$^T$ m$^3$/hr and $\pi$=[3.0,1.8,11.6,13,11.9, 10.2,6.6,10.3,10.9,12.9]$^T$ m. A disruption was modeled by considering a failure of pump 414 resulting in unavailability of reservoir 402 and reservoir 401 supplying $d_1$=680 m$^3$/hr. This contingency would result in $\pi$=[3.0,0,0,9.1,13,8,8,7.7, 4.1,8.2,9.6,12.7]$^T$ m, which violates the minimum pressure needed at nodes 3 and 5-9.

To study a scenario where not all agents have control capability, only two demand nodes, namely demand 403 and demand 408, are allowed to reduce demand by 50 m$^3$/hr. Further, tank 410 has an injection flexibility of ±200 m$^3$/hr and reservoir 401 has a controllable pressure range of [0,5] m.

Figure 5A:
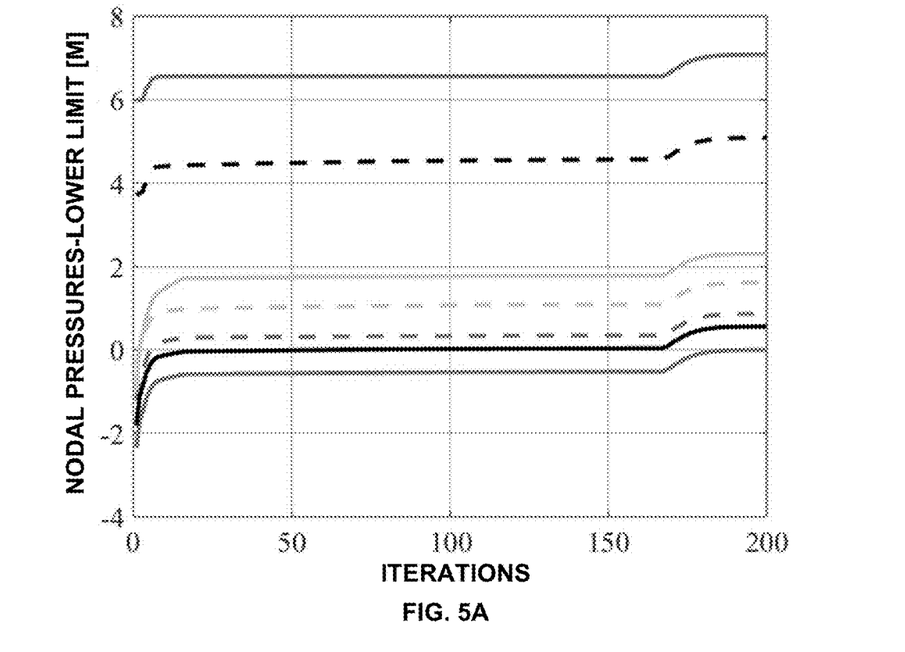
FIGS. 5A and 5B are graphical plots illustrating the results of using the techniques described herein to control the water distribution system shown in FIG. 4.
Figure 5B:
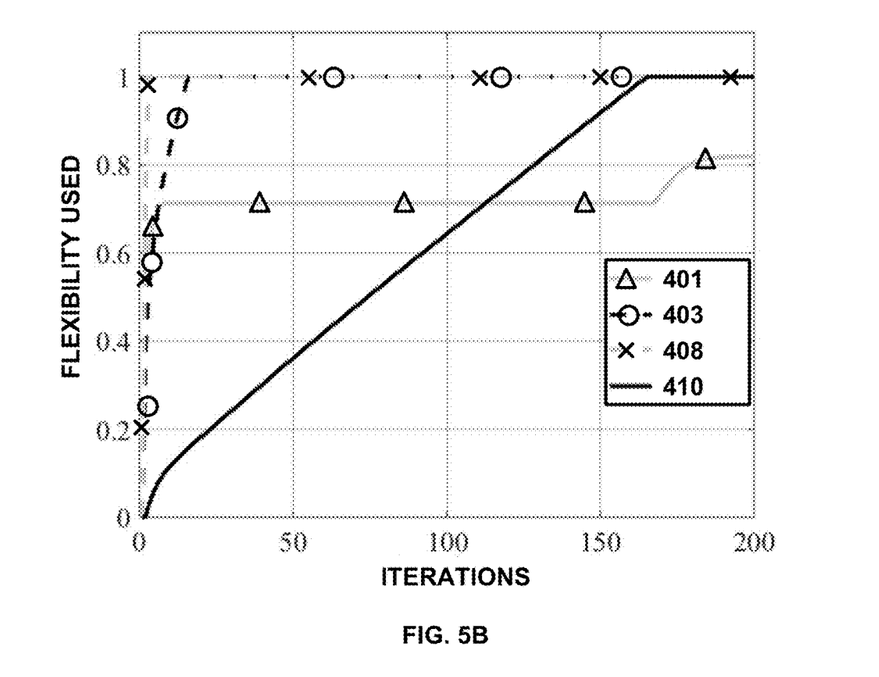

FIGS. 5A and 5B are graphical plots illustrating the results of using the techniques described herein to control water distribution system 400 shown in FIG. 4. Specifically FIG. 5A shows the difference of pressures($\pi_n$-$\underline{\pi}_n$) for nodes n={3 . . . 10}. As anticipated, the pressures are non-decreasing and the techniques of the present disclosure succeed in restoring them above the respective lower limits. FIG. 5B plots the ratio of control resource used $u_n/\bar{u}_n$ for nodes {1,3,8,10}. As desired, once all pressures are restored at desired levels, the algorithm attains an equilibrium and u saturates.

Figure 6:
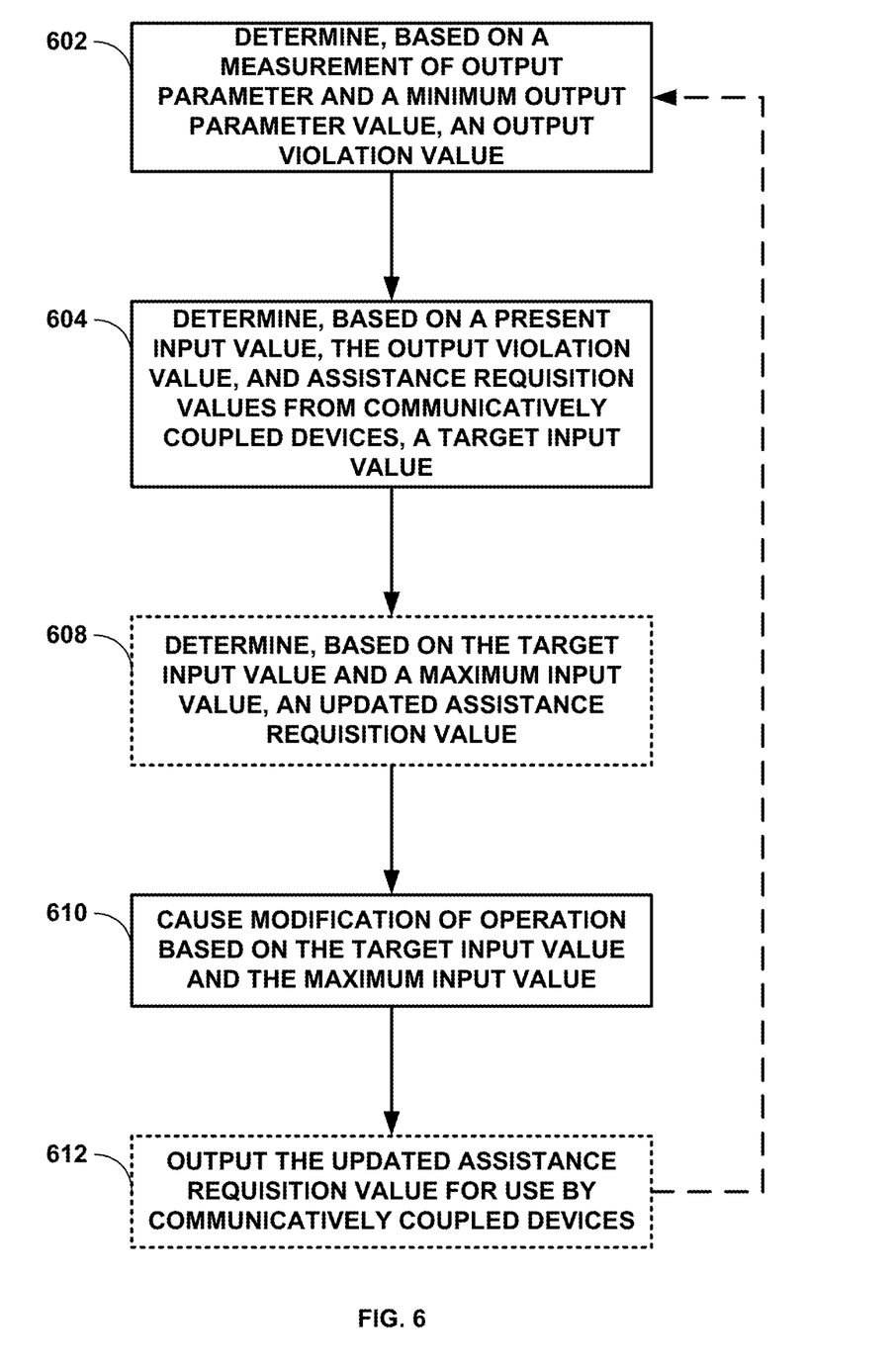
FIG. 6 is a flow diagram illustrating example operations for performing ripple-type control of networked physical systems, in accordance with one or more aspects of the present disclosure.

FIG. 6 is a flow diagram illustrating example operations for performing ripple-type control of networked physical systems, in accordance with one or more aspects of the present disclosure. FIG. 6 represents only one example process for performing ripple-type control of networked systems as described herein, and various other or additional operations may be used in other examples. The example operations of FIG. 6 are described below within the context of FIG. 1.

In the example of FIG. 6, a computing device that includes at least one processor may determine, based on a measurement of an output parameter and a minimum output parameter value, an output violation value (602). For example, computing device 104 may determine an output violation value for node 102A, based on a measurement of the output parameter at node 102A and a minimum output parameter value. The minimum output parameter value may be a static value defined by, e.g., an operator of system 100.

The computing device, in the example of FIG. 6, may determine, based on a present input value, the output violation value, and assistance requisition values from communicatively coupled devices, a target input value (604). For example, node 102B (or an associated computing device) may output assistance requisition value 110, indicating node 102B's need for assistance in meeting its desired output. Computing device 104 may determine a target input value for node 102A based on a present input value for node 102A, the output violation value for node 102A (as determined in operation 602), and assistance requisition value 110.

In the example of FIG. 6, the computing device may determine, based on the target input value and a maximum input value, an updated assistance requisition value (608). For example, computing device 104 may determine an updated assistance requisition value for node 102A, based on the target input value (as determined in operation 604) and a maximum input value for node 102A. In some examples, the maximum input value for node 102A may be a property of node 102A. In other examples, the maximum input value for node 102A may be defined by, e.g., an operator of node 102A. Operation 608 is shown in FIG. 6 using a dotted line, indicating that this operation may not always be performed. That is, in some examples, a computing device may not determine an updated requisition assistance value.

The computing device, in the example of FIG. 6, may cause modification of operation based on the target input value and the maximum input value (610). For example, computing device 104 may cause node 102A to modify its operation based on the target input value (as determined in operation 604) and the maximum input value. In this way, computing device 104 may cause node 102A to assist communicatively coupled nodes (e.g., nodes 102B and 102E) in meeting their target outputs.

In the example of FIG. 6, the computing device may output the updated assistance requisition value for use by communicatively coupled devices (612). For example, computing device 104 may output updated assistance requisition value 112 (as determined in operation 608) for use by nodes 102B and 102E. Operation 612 is shown in FIG. 6 using a dotted line, indication that this operation may not always be performed. That is, in some examples, a computing device may not output updated an assistance requisition value.

The example operations of FIG. 6 may be performed in an iterative fashion. That is, each of operations 602, 604, 608, 610, and/or 612 may be performed, sequentially, any number of times. These operations may be performed by computing devices at a faster timescale, allowing for improved operation during the period between receiving setpoints from, e.g., a central controller. That is, in some examples, nodes in a networked system may receive control setpoints determined by a central controller of the system, indicating an "optimal" operation of the system at that time. Computing these setpoints can be computationally complex and thus nodes may only receive control setpoints periodically. In the interim, as conditions change, those setpoints may quickly stray from "optimal". The techniques described herein may be iteratively performed to ensure stable operation of network 100 (if feasible) until new setpoints are received from the central controller.

The present disclosure provides a novel ripple-type coordination scheme for emergency control of networked systems. The involved agents act based upon local control rules as long as local resources have not been saturated. Otherwise, they solicit help from peer agents through a "hotline" communication network not necessarily coinciding with the underlying physical system graph. The algorithm appears to converge to safe operating conditions under an appropriate choice of parameters. Its validity has been illustrated on power and water network examples.

At least some of the techniques of the present disclosure may additionally or alternatively described by one or more of the following examples.

Example 1: A device comprising at least one processor configured to: determine, for a first controllable device in a networked physical system, based on a measurement of an output parameter at the first controllable device and a minimum output parameter value, an output violation value for the first controllable device; determine, based on a present input value for the first controllable device, the output violation value, and an assistance requisition value that corresponds to a second device in the networked physical system that is communicatively coupled to the first controllable device, a target input value for the first controllable device; and cause the first controllable device to modify operation based on the target input value and a maximum input value for the first controllable device.

Example 2: The device of example 1, wherein the at least one processor is further configured to: determine, based on the target input value and the maximum input value, an updated assistance requisition value for the first controllable device; and output, for use by devices in the networked physical system that are communicatively coupled to the first controllable device, the updated assistance requisition value.

Example 3: The device of example 2, wherein determining the updated assistance requisition value comprises: determining a difference between the target input value and the maximum input value; responsive to determining that the difference is larger than or equal to zero, designating a scaled version of the difference as the updated assistance requisition value; and responsive to determining that the difference value is less than zero, designating zero as the updated assistance requisition value.

Example 4: The device of example 3, wherein determining the updated assistance requisition value comprises determining $\lambda_n(t+1)=\max\{0, \eta_{3,n}(\hat{u}_n(t+1)-\overline{u}_n)\}$, wherein: n denotes the first controllable device; $\lambda_n(t+1)$ denotes the updated assistance requisition value for the first controllable device; $\eta_{3,n}$ denotes a positive scaling factor for the first controllable device; $\hat{u}_n(t+1)$ denotes the target input value for the first controllable device; and $\overline{u}_n$ denotes the maximum input value for the first controllable device.

Example 5: The device of any of examples 1-4, wherein determining the output violation value comprises: determining a difference between measurement and the minimum output parameter value; responsive to determining that the difference is greater than zero, determining the output violation value to be the difference; and responsive to determining that the difference is not greater zero, determining the output violation value to be zero.

Example 6: The device of any of examples 1-5, wherein determining the target input value comprises summing the present input value, a scaled version of output violation value, and a scaled version of the assistance requisition value.

Example 7: The device of example 6, wherein determining target input value comprises determining $\hat{u}_n(t+1)=u_n(t)+\eta_{1,n}f_n(t)+\eta_{2,n}A_n\lambda(t)$, wherein: n denotes the first controllable device; $\hat{u}_n(t+1)$ denotes the target input value for the first controllable device; $u_n(t)$ denotes the present input value for the first controllable device; $\eta_{1,n}$ denotes a first positive scaling factor for the first controllable device; $f_n(t)$ denotes the output violation value for the first controllable device; $\eta_{2,n}$ denotes a second positive scaling factor for the first controllable device; $A_n$ denotes an adjacency matrix for the first controllable device, the adjacency matrix indicating devices in the networked physical system that are communicatively coupled to the first controllable device; and $\lambda(t)$ denotes a vector of assistance requisition values, including the assistance requisition value that corresponds to the second device.

Example 8: The device of any of examples 1-7, wherein: the networked physical system comprises a power system; the output parameter comprises voltage; and the minimum output parameter value comprises a voltage value.

Example 9: The device of example 8, wherein each of the present input value, the target input value, and the maximum input value comprises a respective power value. In some examples, each of the present input value, the target input value, and the maximum input value comprises a respective reactive power value.

Example 10: The device of example 8, wherein each of the present input value, the target input value, and the maximum input value comprises a respective voltage value.

Example 11: The device of any of examples 1-7, wherein: the networked physical system comprises a water system; the output parameter comprises water pressure; and the minimum output parameter value comprises a water pressure value.

Example 12: The device of example 11, wherein each of the present input value, the target input value, and the maximum input value comprises a respective water pressure value.

Example 13: The device of any of examples 1-12, wherein the at least one processor is further configured to perform the following operations in an iterative fashion: determining the output violation value; determining the target input value; and causing the first controllable device to modify operation.

Example 14: A method comprising: determining, by a computing device comprising at least one processor, for a first controllable device in a networked physical system, based on a measurement of an output parameter at the first controllable device and a minimum output parameter value, an output violation value for the first controllable device; determining, by the computing device, based on a present input value for the first controllable device, the output violation value, and an assistance requisition value that corresponds to a second device in the networked physical system that is communicatively coupled to the first controllable device, a target input value for the first controllable device; and causing the first controllable device to modify operation based on the target input value and a maximum input value for the first controllable device.

Example 15: The method of example 14, further comprising: determining, based on the target input value and the maximum input value, an updated assistance requisition value for the first controllable device; and outputting, for use by devices in the networked physical system that are communicatively coupled to the first controllable device, the updated assistance requisition value.

Example 16: The method of example 15, wherein determining the updated assistance requisition value comprises: determining a difference between the target input value and the maximum input value; responsive to determining that the difference is larger than or equal to zero, designating a scaled version of the difference as the updated assistance requisition value; and responsive to determining that the difference value is less than zero, designating zero as the updated assistance requisition value.

Example 17: The method of any of examples 14-16, wherein determining the target input value comprises summing the present input value, a scaled version of output violation value, and a scaled version of the assistance requisition value.

Example 18: The method of any of examples 14-17, wherein: the networked physical system comprises a power system; the output parameter comprises voltage; and the minimum output parameter value comprises a voltage value.

Example 19: The method of any of examples 14-17, wherein: the networked physical system comprises a water system; the output parameter comprises water pressure; and the minimum output parameter value comprises a water pressure value.

Example 20: The method of any of examples 14-19, wherein the first controllable device is the computing device.

Example 21: A system comprising: a plurality of devices in a networked physical system, wherein each device in the plurality of devices comprises at least one processor configured to: determine, based on a respective measurement of an output parameter at the device and a minimum output parameter value, a respective output violation value; and determine, based on a respective present input value, the respective output violation value, and an assistance requisition value that corresponds to another device in the plurality of devices that is communicatively coupled to the device, a respective target input value; and wherein the at least one processor of at least one device in the plurality of devices is further configured to: modify its operation based on the respective target input value and a respective maximum input value.

Example 22: The system of example 22, wherein the at least one processor of each device in the plurality of devices is further configured to: determine, based on the respective target input value and the respective maximum input value, a respective updated assistance requisition value; and output, for use by other devices in the plurality of devices that are communicatively coupled to the device, the respective updated assistance requisition value.

The following proofs are provided for completeness.

Proof of Proposition 1: Owing to the projection in (12), it is evident that $u(t) \leq \bar{u}$ for all t. Thus, proving a non-decreasing property $u(t) \leq u(t+1)$ for all t is sufficient for establishing convergence of the sequence $\{u(t)\}$. Consider an arbitrary node n and time t. When $u_n(t+1) = \bar{u}_n$, one trivially has $u_n(t) \leq u_n(t+1)$. When $u_n(t+1) > \bar{u}_n$, Step 4 yields $\hat{u}_n(t+1) = u_n(t+1)$ and (10) implies $$u_n(t+1) = u_n(t) + \eta_{1,n} f_n(t) + \eta_{2,n} \Sigma_{m=1}^{N} A_{nm} \lambda_m(t) \geq u_n(t)$$

because $f_n(t)$ and $\lambda_m(t)$ are non-negative; $\eta_{1,n}$ and $\eta_{2,n}$ are positive; and matrix A has non-negative entries.

Proof of Proposition 2: Assume $u \in \mathcal{F}$ and $\lambda = 0$. It follows that $y(u) \geq \underline{y}$ and so $f(u) = 0$ from (9). Upon initializing the proposed control scheme at u and $\lambda$, Step 1 provides $f(u) = 0$; Step 2 yields $\hat{u}(1) = u$; Step 3 provides $\lambda(1) = 0$; and Step 4 that $u(1) = u$. Therefore, $(u, \lambda)$ is an equilibrium for the proposed control steps.

To establish the reverse direction, one can prove the contra-positive statement, i.e., if u does not belong to $\mathcal{F}$ or $\lambda \neq 0$, then $(u, \lambda)$ is not an equilibrium. The two cases are shown separately using proof by contradiction.

Case 1) Vector u does not belong to $\mathcal{F}$: since $\mathcal{F}$ is not empty by hypothesis, Assumption 1 implies that $y(\bar{u}) \geq y(u')$ for $\underline{u} \leq u' \leq \bar{u}$ and hence $$y(\bar{u}) \geq \underline{y}. \tag{14}$$

In other words, applying the maximum control effort makes the constraints on observed outputs hold. Suppose $u \notin \mathcal{F}$, yet there exists a $\lambda$ such that $(u, \lambda)$ is an equilibrium for the algorithm. Since u is projected in its permissible range by (12), its infeasibility means there exists a node $n \in \mathcal{F}$ such that $$\underline{y}_n > y_n(u) \tag{15}$$

Define $\hat{u}_n := u_n + \eta_{1,n} f_n(u) + \eta_{2,n} \Sigma_{=1}^{N} A_{n,} \mathcal{F} \lambda \mathcal{F}$ as in (10). Because $f_n(u) > 0$, it follows that $\hat{u}_n > u_n$. However, since by hypothesis $u_n = \min\{\hat{u}_n, \bar{u}_n\}$, it follows that $u_n = \bar{u}_n$ and $\hat{u}_n > \bar{u}_n$, so that $\lambda_n > 0$.

Consider a node m neighbor of n in $\mathcal{F}_c$ and define $$\hat{u}_m = u_m + \eta_{1,m} f_m(u) + \eta_{2,m} \Sigma_{=1}^{N} A_{m,} \mathcal{F} \lambda \mathcal{F} \tag{16}$$

Since $\lambda_n > 0$ and $u_m = \min\{\hat{u}_m, \bar{u}_m\}$, it holds again that $\hat{u}_m > u_m = \bar{u}_m$ and so $\lambda_m > 0$. Repeating this argument for all neighbors of n, one gets that $\lambda > 0$ and that $$u = \bar{u} \tag{17}$$

This concludes the proof for Case 1 since (15) and (17) contradict (14).

Case 2) Vector $\lambda \neq 0$: Suppose $u \in \mathcal{F}$, and there exists a $\lambda \neq 0$ such that $(u, \lambda)$ is an equilibrium for the proposed scheme. First, note that by plugging (10) into (11), $\lambda(t+1)$ can be expressed as a function of $\lambda(t)$ and $u(t)$ as $$\lambda(t+1) = \max\{0, dg(\eta_3)(u(t)+dg(\eta_1)f(u(t))-dg(\eta_2)A\lambda(t)-\bar{u})\}$$

The feasibility assumption provides $f(u)=0$ and the equilibrium condition yields $$\lambda = \max\{0, dg(\eta_3)(u+dg(\eta_2)A\lambda-\bar{u}\} \leq \max\{0, +dg(\eta_3)dg(\eta_2)A\lambda\} \leq +dg(\eta_3)dg(\eta_2)A\lambda. \quad (18)$$

where the first and the second inequalities stem from the fact that $u-\bar{u}$ and $dg(\eta_2)dg(\eta_3)A\lambda(t)$ have non-positive entries.

Invoking the norm inequality on (18) results in $\|\lambda\| \leq \|dg(\eta_2)dg(\eta_3)A\| \|\lambda\|$. Also, using the condition $\|dg(\eta_2)dg(\eta_3)A\| < 1$ with $\lambda \neq 0$ yields $\|\lambda\| < \|\lambda\|$, which is a contradiction.

In one or more examples, the techniques described herein may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media, which includes any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable storage medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of inter-operative hardware units, including one or more processors as described above, in conjunction with suitable software and/or firmware.

The foregoing disclosure includes various examples set forth merely as illustration. The disclosed examples are not intended to be limiting. Modifications incorporating the spirit and substance of the described examples may occur to persons skilled in the art. These and other examples are within the scope of this disclosure and the following claims.

What is claimed is:

1. A device comprising:
   at least one processor configured to iteratively:
   determine, based on a measurement of an output voltage at a first controllable device in a power system and a minimum output voltage value for the first controllable device, an output voltage violation value for the first controllable device;
   receive an assistance requisition value from a second device in the power system, wherein the second device is communicatively coupled to the first controllable device;
   determine, based on a present input reactive power value for the first controllable device, the output voltage violation value, and the assistance requisition value from the second device, a target input reactive power value for the first controllable device; and
   modify operation of the first controllable device based on the target input reactive power value and a maximum input reactive power value for the first controllable device,
   wherein determining the target input reactive power value comprises determining $\widehat{u_n}(t+1) = u_n(t) + \eta_{1,n} f_n(t) + \eta_{2,n} A_n \lambda(t)$, wherein:
   n denotes the first controllable device;
   $\widehat{u_n}(t+1)$ denotes the target input reactive power value for the first controllable device;
   $u_n(t)$ denotes the present input reactive power value for the first controllable device;
   $\eta_{1,n}(t)$ denotes a first positive scaling factor for the first controllable device;
   $f_n(t)$ denotes the output voltage violation value for the first controllable device;
   $\eta_{2,n}$ denotes a second positive scaling factor for the first controllable device;
   $A_n$ denotes an adjacency matrix for the first controllable device, the adjacency matrix indicating devices in the power system that are communicatively coupled to the first controllable device; and λ(t) denotes a vector of assistance requisition values, including the assistance requisition value that corresponds to the second device.

2. The device of claim 1, wherein the at least one processor is further configured to:
   determine, based on the target input reactive power value and the maximum input reactive power value, an updated assistance requisition value for the first controllable device; and
   output, for use by one or more devices communicatively coupled to the first controllable device, the updated assistance requisition value.

3. The device of claim 2, wherein determining the updated assistance requisition value comprises:
   determining a difference between the target input reactive power value and the maximum input reactive power value;
   responsive to determining that the difference is larger than or equal to zero, designating a scaled version of the difference as the updated assistance requisition value; and
   responsive to determining that the difference value is less than zero, designating zero as the updated assistance requisition value.

4. The device of claim 3, wherein determining the updated assistance requisition value comprises determining $\lambda_n(t+1) = \max\{0, \eta_{3,n}(\widehat{u_n}(t+1) - \overline{u_n})\}$, wherein:
   n denotes the first controllable device;
   $\lambda_n(t+1)$ denotes the updated assistance requisition value for the first controllable device;
   $\eta_{3,n}$ denotes a positive scaling factor for the first controllable device;
   $\widehat{u_n}(t+1)$ denotes the target input reactive power value for the first controllable device; and
   $\overline{u_n}$ denotes the maximum input reactive power value for the first controllable device.

5. A method comprising iteratively:
   determining, by a computing device comprising at least one processor, based on a measurement of an output voltage at a first controllable device in a power system and a minimum output voltage value for the first controllable device, an output voltage violation value for the first controllable device;
   receiving, by the computing device, an assistance requisition value from a second device in the power system, wherein the second device is communicatively coupled to the first controllable device;
   determining, by the computing device, based on a present input reactive power value for the first controllable device, the output voltage violation value, and the assistance requisition value, a target input reactive power value for the first controllable device; and
   modifying, by the computing device, operation of the first controllable device based on the target input reactive power value and a maximum input reactive power value for the first controllable device,
   wherein determining the target input reactive power value comprises determining $\widehat{u_n}(t+1) = u_n(t) + \eta_{1,n} f_n(t) + \eta_{2,n} A_n \lambda(t)$, wherein:
   n denotes the first controllable device;
   $\widehat{u_n}(t+1)$ denotes the target input reactive power value for the first controllable device;
   $u_n(t)$ denotes the present input reactive power value for the first controllable device;
   $\eta_{1,n}$ denotes a first positive scaling factor for the first controllable device;
   $f_n(t)$ denotes the output voltage violation value for the first controllable device;
   $\eta_{2,n}$ denotes a second positive scaling factor for the first controllable device;
   $A_n$ denotes an adjacency matrix for the first controllable device, the adjacency matrix indicating devices in the power system that are communicatively coupled to the first controllable device; and
   λ(t) denotes a vector of assistance requisition values, including the assistance requisition value that corresponds to the second device.

6. The method of claim 5, further comprising:
   determining, based on the target input reactive power value and the maximum input reactive power value, an updated assistance requisition value for the first controllable device; and
   outputting, for use by one or more devices communicatively coupled to the first controllable device, the updated assistance requisition value.

7. The method of claim 6, wherein determining the updated assistance requisition value comprises:
   determining a difference between the target input reactive power value and the maximum input reactive power value;
   responsive to determining that the difference is larger than or equal to zero, designating a scaled version of the difference as the updated assistance requisition value; and
   responsive to determining that the difference value is less than zero, designating zero as the updated assistance requisition value.

8. The method of claim 5, wherein the first controllable device is the computing device.

9. A system comprising:
   a plurality of devices in a power system, wherein each device in the plurality of devices comprises at least one processor configured to:
   determine, based on a respective measurement of an output voltage at the respective device and a respective minimum output voltage value, a respective output voltage violation value;
   receive an assistance requisition value from another device in the plurality of devices communicatively coupled to the respective controllable device; and
   determine, based on a respective present input reactive power value, the respective output voltage violation value, and the assistance requisition value, a respective target input reactive power value; and
   wherein the at least one processor of at least one device in the plurality of devices is further configured to:
   modify its operation based on the respective target input reactive power value and a respective maximum input reactive power value,
   wherein determining the respective target input reactive power value comprises determining $\widehat{u_n}(t+1) = u_n(t) + \eta_{1,n} f_n(t) + \eta_{2,n} A_n \lambda(t)$, wherein:
   n denotes the respective device;
   $\widehat{u_n}(t+1)$ denotes the respective target input reactive power value for the respective device;
   $u_n(t)$ denotes the respective present input reactive power value for the respective device;
   $\eta_{1,n}$ denotes a respective first positive scaling factor for the respective device;
   $f_n(t)$ denotes the respective output voltage violation value for the respective device;
   $\eta_{2,n}$ denotes a respective second positive scaling factor for the respective device;

$A_n$ denotes a respective adjacency matrix for the respective device, the respective adjacency matrix indicating devices in the plurality of devices that are communicatively coupled to the respective device; and $\lambda(t)$ denotes a respective vector of assistance requisition values, including the assistance requisition value that corresponds to the other device.

10. The system of claim 9, wherein the at least one processor of each device in the plurality of devices is further configured to:

determine, based on the respective target input reactive power value and the respective maximum input reactive power value, a respective updated assistance requisition value; and output, for use by one or more other devices in the plurality of devices that are communicatively coupled to the device, the respective updated assistance requisition value.

* * * * *